US012812321B2

(12) United States Patent
Kaetel

(10) Patent No.: US 12,812,321 B2
(45) Date of Patent: Nov. 24, 2026

(54) APPARATUS AND METHOD FOR SUPPLYING SOUND IN A SPACE

(71) Applicant: Kaetel Systems GmbH, Munich (DE)

(72) Inventor: Klaus Kaetel, Munich (DE)

(73) Assignee: KAETEL SYSTEMS GMBH, Munich (DE)

(*) Notice: Subject to any disclaimer, the term of this patent is extended or adjusted under 35 U.S.C. 154(b) by 219 days.

(21) Appl. No.: 18/402,911

(22) Filed: Jan. 3, 2024

(65) Prior Publication Data

US 2024/0147184 A1 May 2, 2024

Related U.S. Application Data

(63) Continuation of application No. PCT/EP2022/069667, filed on Jul. 13, 2022.

(30) Foreign Application Priority Data

Jul. 19, 2021 (DE) ..................... 10 2021 207 693.9
Sep. 30, 2021 (DE) ..................... 10 2021 211 051.7

(51) Int. Cl.
*H04S 7/00* (2006.01)
*H04R 5/04* (2006.01)

(52) U.S. Cl.
CPC ............... *H04S 7/305* (2013.01); *H04R 5/04* (2013.01); *H04S 7/303* (2013.01); (Continued)

(58) Field of Classification Search
CPC ...... H04S 7/303; H04S 7/305; H04S 2400/01; H04S 2400/15; H04R 5/04; H04R 2205/024
See application file for complete search history.

(56) References Cited

U.S. PATENT DOCUMENTS 4,329,544 A * 5/1982 Yamada .................. H04S 1/002 381/1
4,748,669 A 5/1988 Klayman
(Continued)

FOREIGN PATENT DOCUMENTS

CN 106961647 A 7/2017
CN 107852563 A 3/2018
(Continued)

OTHER PUBLICATIONS

Non-Final Office Action dated Dec. 17, 2025, issued in U.S. Appl. No. 18/615,161.
(Continued)

*Primary Examiner* — Paul W Huber
(74) *Attorney, Agent, or Firm* — McClure, Qualey & Rodack, LLP

(57) ABSTRACT

Apparatus for supplying sound with first and second loudspeakers including: a control signal generator for generating a first control signal for the first loudspeaker and a second control signal for the second loudspeaker. The control signal generator includes: a mix signal generator stage generating a first mix signal for the first control signal and a second mix signal for the second control signal from a first channel signal or a second channel signal such that the first mix signal and the second mix signal have a phase difference; a mixer stage for mixing the first channel signal with the first mix signal to obtain the first control signal, and for mixing the second channel signal with the second mix signal to obtain the second control signal; and an interface for transmitting the first control signal to the first loudspeaker and for transmitting the second control signal to the second loudspeaker.

19 Claims, 10 Drawing Sheets

(52) U.S. Cl.
CPC .... *H04R 2205/024* (2013.01); *H04S 2400/01* (2013.01); *H04S 2400/15* (2013.01)

(56) References Cited

U.S. PATENT DOCUMENTS

| | | | | | |
|---|---|---|---|---|---|
| 4,812,921 | A * | 3/1989 | Mitsuhashi ...... | G11B 20/00992 386/338 |
| 5,524,053 | A * | 6/1996 | Iwamatsu ............... | H04S 7/305 381/63 |
| 5,970,153 | A * | 10/1999 | Petroff ..................... | H04R 5/04 381/28 |
| 9,197,963 | B1 | 11/2015 | North | |
| 10,952,005 | B1 | 3/2021 | McGrael | |
| 11,223,886 | B1 | 1/2022 | Fadul | |
| 2003/0076964 | A1 | 4/2003 | Stickles | |
| 2004/0005066 | A1 | 1/2004 | Kraemer | |
| 2005/0129258 | A1 | 6/2005 | Fincham | |
| 2005/0135639 | A1 | 6/2005 | Levy | |
| 2006/0215866 | A1 | 9/2006 | Francisco | |
| 2008/0035417 | A1 | 2/2008 | Combest | |
| 2008/0279412 | A1 | 11/2008 | Bertoli | |
| 2009/0304213 | A1 | 12/2009 | Cook | |
| 2010/0246880 | A1 | 9/2010 | Oxford | |
| 2010/0272295 | A1 | 10/2010 | Nakatani | |
| 2012/0008812 | A1 | 1/2012 | Sporer | |
| 2013/0163783 | A1 | 6/2013 | Burlingame | |
| 2013/0287228 | A1 | 10/2013 | Kallai | |
| 2014/0161271 | A1 | 6/2014 | Teranishi | |
| 2015/0237446 | A1 | 8/2015 | Katayama | |
| 2016/0073195 | A1 | 3/2016 | Adamson | |
| 2016/0088393 | A1 | 3/2016 | Miyasaka et al. | |
| 2017/0353812 | A1 | 12/2017 | Schaefer | |
| 2018/0192229 | A1 | 7/2018 | Easley | |
| 2018/0302737 | A1 | 10/2018 | Laitinen | |
| 2020/0189436 | A1 | 6/2020 | Soltner | |
| 2020/0221243 | A1 | 7/2020 | Schaefer | |
| 2020/0228910 | A1 | 7/2020 | Mariglio, III | |
| 2021/0306788 | A1 * | 9/2021 | Kim ....................... | H04R 5/023 |
| 2023/0362532 | A1 | 11/2023 | Kaetel | |
| 2024/0040303 | A1 | 2/2024 | Kaetel | |

FOREIGN PATENT DOCUMENTS

| | | | |
|---|---|---|---|
| CN | 111775861 | A | 10/2020 |
| DE | 10 2021 200 552 | A1 | 7/2022 |
| DE | 10 2021 203 640 | A1 | 10/2022 |
| EP | 1 280 377 | A1 | 1/2003 |
| EP | 2 692 144 | B1 | 2/2017 |
| EP | 2 692 154 | B1 | 9/2017 |
| EP | 2 692 151 | B1 | 1/2018 |
| EP | 3 061 262 | B1 | 1/2018 |
| EP | 3 061 266 | B1 | 9/2020 |
| JP | H07131883 | A | 5/1995 |
| JP | 2897586 | B2 | 5/1999 |
| JP | 2004135023 | A | 4/2004 |
| JP | 2008193394 | A | 8/2008 |
| TW | 201916694 | A | 4/2019 |
| WO | 87/06090 | A1 | 10/1987 |
| WO | 2009/071911 | A2 | 6/2009 |
| WO | 2010/105280 | A1 | 9/2010 |
| WO | 2012/172394 | A1 | 12/2012 |

OTHER PUBLICATIONS

International Search Report and Written Opinion dated Mar. 15, 2023, issued in application No. PCT/EP2022/069667.

Office Action dated May 27, 2026, issued in U.S. Appl. No. 18/615,148.

English language office action dated Apr. 16, 2026, issued in U.S. Appl. No. 18/615,161.

* cited by examiner

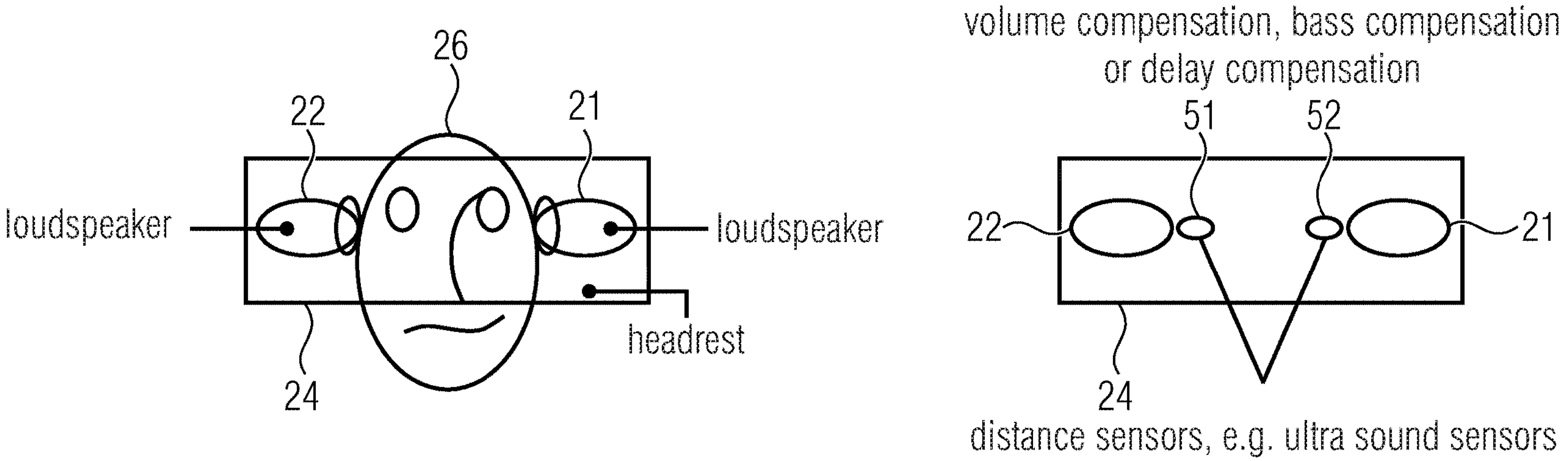

distance between head and loudspeaker increases:

→ sound processor increases level and/or basses for this loudspeaker

→ optional: delay for the loudspeaker decreases compared to the other loudspeaker distance between the head and loudspeaker decreases:

→ sound processor reduces level and/or basses for this loudspeaker

→ optional: delay for the loudspeaker increases compared to other loudspeakers

Fig. 10

APPARATUS AND METHOD FOR SUPPLYING SOUND IN A SPACE

CROSS-REFERENCES TO RELATED APPLICATIONS

This application is a continuation of copending International Application No. PCT/EP2022/069667, filed Jul. 13, 2022, which is incorporated herein by reference in its entirety, and additionally claims priority from German Applications Nos. DE 10 2021 207 693.9, filed Jul. 19, 2021, and DE 10 2021 211 051.7, filed Sep. 30, 2021, all of which are incorporated herein by reference in its entirety.

The present invention concerns electroacoustic and in particular concepts for generating and reproducing audio signals in a space, such as in a vehicle or a stationary space, such as a hall, a waiting area, etc.

BACKGROUND OF THE INVENTION

Typically, acoustic scenes are recorded using a set of microphones. Each microphone outputs a microphone signal. For example, 25 microphones may be used for an audio scene of an orchestra. A sound engineer then mixes the 25 microphone output signals, e.g., into a standard format such as a stereo format, a 5.1 format, a 7.1 format, a 7.2 format, or any other corresponding format. In case of a stereo format, e.g., the sound engineer or an automatic mixing process generates two stereo channels. In the case of a 5.1 format, mixing results in five channels and one subwoofer channel. Analogously, in case of a 7.2 format, e.g., mixing results in seven channels and two subwoofer channels. If the audio scene is to be rendered in a reproduction environment, a mixing result is applied to electrodynamic loudspeakers. In a stereo reproduction scenario, there are two loudspeakers, the first loudspeaker receiving the first stereo channel and the second loudspeaker receiving the second stereo channel. For example, in a 7.2 reproduction format, there are seven loudspeakers at predetermined positions, and two subwoofers, which can be placed relatively arbitrarily. The seven channels are applied to the corresponding loudspeakers, and the subwoofer channels are applied to the corresponding subwoofers.

The use of a single microphone arrangement when capturing audio signals, and the use of a single loudspeaker arrangement when reproducing the audio signals typically neglects the true nature of the sound sources. European patent EP 2692154 B1 describes a set for capturing and reproducing an audio scene, in which not only the translation but also the rotation and, in addition, the vibration is captured and reproduced. Thus, a sound scene is not only reproduced by a single capturing signal or a single mixed signal but by two capturing signals or two mixed signals that, on the one hand, are recorded simultaneously, and that, on the other hand, are reproduced simultaneously. This ensures that different emission characteristics of the audio scene are recorded compared to a standard recording, and are reproduced in a reproduction environment.

To this end, as is illustrated in the European patent, a set of microphones is placed between the acoustic scene and a (imaginary) listener space to capture the "conventional" or translation signal that is characterized by a high directionality, or high quality.

In addition, a second set of microphones is placed above or to the side of the acoustic scene to record a signal with lower quality, or lower directionality, that is intended to represent the rotation of the sound sources in contrast to the translation.

On the reproduction side, corresponding loudspeakers are placed at the typical standard positions, each of which has a omnidirectional arrangement to reproduce the rotation signal, and a directional arrangement to reproduce the "conventional" translational sound signal. In addition, there is a subwoofer at each of the standard positions, or there is only a single subwoofer at an arbitrary location.

European patent EP 2692144 B1 discloses a loudspeaker for reproducing, on the one hand, the translational audio signal and, on the other hand, the rotatory audio signal. Thus, the loudspeaker has, on the one hand, an arrangement that emits in an omnidirectional manner, and, on the other hand, an arrangement that emits in a directional manner.

European patent EP 2692151 B1 discloses an electret microphone that can be used for recording the omnidirectional or the directional signal.

European patent EP 3061262 B1 discloses earphones and a method for manufacturing earphones that generate both a translational sound field and a rotatory sound field.

European patent EP 3061266 B1 discloses earphones and a method for producing earphones configured to generate the "conventional" translational sound signal by using a first transducer, and to generate the rotatory sound field by using a second transducer arranged perpendicular to the first transducer.

Recording and reproducing the rotatory sound field in addition to the translational sound field leads to a significantly improved and therefore high-quality audio signal perception that almost conveys the impression of a live concert, even though the audio signal is reproduced by the loudspeaker or headphones or earphones.

This achieves a sound experience that can almost not be distinguished from the original sound scene in which the sound is not emitted by loudspeakers but by musical instruments or human voices. This is achieved by considering that the sound is emitted not only translationally but also in a rotary manner and possibly also in a vibrational manner, and is therefore to be recorded and reproduced accordingly.

A disadvantage of the concept described is that recording the additional signal that reproduces the rotation of the sound field represents a further effort. In addition, there are many pieces of music, for example classical pieces or pop pieces, where only the conventional translational sound field has been recorded. Typically, the data rate of these pieces is heavily compressed, e.g., according to the MP3 standard or the MP4 standard, contributing to an additional deterioration of quality, however, which is typically only audible for experienced listeners. On the other hand, there are almost no audio pieces that have not been recorded at least in the stereo format, i.e. with a left channel and a right channel. Rather, the development goes towards generating more channels than only a left and a right channel, i.e. generating surround recordings with five channels or even recordings with higher formats, for example, which is known under the keyword MPEG surround or Dolby Digital in the technology.

Thus, there are many pieces that have been recorded at least in the stereo format, i.e. with a first channel for the left side and a second channel for the right side. There are even more and more pieces where recording has been done with more than two channels, e.g., for a format with several channels on the left side and several channels on the right side and one channel in the center. Even higher level formats use more than five channels in the horizontal plane and in addition also channels from above or channels from obliquely above and possibly also, if possible, channels from below.

However, these formats all have in common that they only reproduce the conventional translatory sound by applying the individual channels to corresponding loudspeakers with corresponding transducers.

SUMMARY

An embodiment may have an apparatus for supplying sound in a space with a first loudspeaker and a second loudspeaker, comprising: a control signal generator for generating a first control signal for the first loudspeaker and a second control signal for the second loudspeaker, wherein the control signal generator comprises: a mix signal generator stage for generating a first mix signal for the first control signal and a second mix signal for the second control signal from a first channel signal or a second channel signal such that the first mix signal and the second mix signal comprise a phase difference; a mixer stage for mixing the first channel signal with the first mix signal to acquire the first control signal, and for mixing the second channel signal with the second mix signal to acquire the second control signal; and an interface for transmitting the first control signal to the first loudspeaker and for transmitting the second control signal to the second loudspeaker.

Another embodiment may have a method for supplying sound in a space with a first loudspeaker and a second loudspeaker, comprising: generating a first control signal for the first loudspeaker and a second control signal for the second loudspeaker, wherein generating comprises: generating a first mix signal for the first control signal and a second mix signal for the second control signal from a first channel signal or a second channel signal such that the first mix signal and the second mix signal comprise a phase difference; mixing the first channel signal with the first mix signal to acquire the first control signal, and for mixing the second channel signal with the second mix signal to acquire the second control signal; and transmitting the first control signal to the first loudspeaker and for transmitting the second control signal to the second loudspeaker.

Another embodiment may have a space, comprising: a first loudspeaker and a second loudspeaker; and an apparatus for supplying sound in the space according the invention.

An inventive apparatus for suppling sound in a space (or in a room) with a first loudspeaker and a second loudspeaker includes a control signal generator for generating a first control signal for the first loudspeaker and a second control signal for the second loudspeaker. In particular, the control signal generator includes a mix signal generator stage and a mixer stage. The mix signal generator stage generates a first and a second mix signal having a phase difference with respect to each other. The mixer stage mixes the two mix signals with the first and the second channel signal, respectively. The inventive apparatus further includes an interface for transmitting the first control signal to the first loudspeaker and for transmitting the second control signal to the second loudspeaker. The interface may be configured to be wired or wireless and, depending on the implementation, may already include power amplifiers or not.

In addition, depending on the implementation, the interface may perform further measures for the control signals, e.g. equalizer processing of the signals, source coding of the signals or source coding and transmitter processing of the signals, so as to transmit the signals, e.g. in a wireless manner by means of a wireless protocol such as Bluetooth or DECT, to an input interface of a loudspeaker module which then typically also includes a power amplifier.

The present invention is based on the finding that a difference wave field around the two loudspeakers and therefore around a person irradiated by the loudspeakers can already be generated by generating a first and a second mix signal, both derived from the first channel signal, the second channel signal or both channel signals, said difference wave field representing, in addition to the translational sound output by the two loudspeakers, also the rotatory sound leading to a significant quality improvement of the subjective audio perception. In particular, no separate loudspeakers are required for generating the difference sound field, but the difference wave field is generated by applying the control signals for the loudspeakers accordingly with signals having a phase difference with respect to each other, wherein this phase difference is advantageously 180°, however, it may be in a range between 160° and 200°, where an almost identical effect is achieved as in the case of the signals having the advantageously best phase shift of 180°.

The effect of the difference wave field is better the closer the first and the second loudspeaker are arranged with respect to each other. Preferably, the loudspeakers should have a distance of at least 10 cm and at most 1 m, wherein distances in the range of 20 cm (e.g. 15-30 cm) are advantageous, as is the particular case in headrests of vehicle seats or other seats, e.g., in waiting areas. The relatively close spatial arrangement of the two loudspeakers particularly achieves that separate sound generators are not necessary for generating the difference wave field. Instead, it is sufficient that the two loudspeakers obtain the special inventive control signals.

In order to generate the control signals, only one channel signal, i.e. either the left channel signal or the right channel signal, can be used. Alternatively, a sum of the two channel signals, i.e. a mono signal, can be used. Alternatively and advantageously, the calculation of the mix signals is based on using a difference between the two channel signals, said difference dominating the mix signals. Depending on the implementation, this difference may be used directly, or it may be combined with a sum signal, or it may be combined with the left channel signal or the right channel signal. However, it is advantageous to either use the difference signal alone for calculating the mix signals, or to use the difference signal in a combination with the sum signal from both channels, wherein the proportion of the difference signal and the proportion of the sum signal in the final mix signals is adjustable, and is advantageously set such that the difference signal determines at least ⅔ of the two mix signals with respect to the corresponding energy in the signals.

In advantageous embodiments, in addition, a distance measurement is provided to determine the distance of the head of the person to be irradiated, or the two ears of the person to be irradiated. These distance sensors are advantageously configured as ultrasound sensors. Such a distance sensor is provided next to each loudspeaker, e.g. in a headrest of a passenger seat or a seat in a waiting area. Thus, the distance of the head side in the vicinity of this loudspeaker may be determined. The distance measurement is used to perform a volume compensation, a bass compensation, or a delay compensation. If the distance between the head and the loudspeaker increases, the level is increased on the side where the distance increase was measured, or the basses are increased for this loudspeaker. Optionally, a delay adaptation for the loudspeaker may be performed, such that the delay for this loudspeaker decreases compared to other loudspeakers.

However, if the distance between the head and the loudspeaker increases, the level and/or the basses for this loudspeaker are decreased. Furthermore, the delay adjustment for this loudspeaker is again optionally performed compared to other loudspeakers such that the delay for the loudspeaker having an increased distance to the head of the user increases.

According to the invention, the loudspeakers are mounted in a space, such as an interior space in a vehicle, e.g. a land vehicle (car, train, sled, motor vehicle, . . . ), an air vehicle ("passenger" aircraft, helicopters, zeppelin, etc.), a water vehicle (boat, ferry, yacht, sailboat, etc.), or a spacecraft, and advantageously in a headrest for a driver of the vehicle or for a passenger or a co-pilot of the vehicle. Alternatively, the space may also be a waiting room, e.g. in a train station, an airport, or a civil service office, or a doctor's office, etc., having arranged therein, for additional comfort or for transmitting information, seats with headrests or seats with apparatuses through which of a person in the room may be supplied with sound relatively close to the head of the person.

The headrest, or the loudspeakers, comprise at least one left and one right loudspeaker arranged left and right, respectively, of a respective ear of the driver or of the passenger or of the person in general.

Preferably, the other sound system in the vehicle or in the space (or room) continues to run in addition and performs, e.g., a localization of sound sources in the space (or room), possibly by amplitude panning, etc. The additional acoustic irradiation by the loudspeakers takes place in parallel to the conventional acoustic irradiation.

Preferably, loudspeakers are provided at several locations in the vehicle, wherein loudspeakers for an unoccupied seat are deactivated, e.g., which may be achieved by a sensor or alternative means.

The loudspeakers generate difference soundwave fields. They may be generated via an oscillating surface (planar transducer) or via two neighboring piston converters oscillating in push-pull mode (loudspeakers) or via other described generators. Mono signals and/or difference signals (L-R and/or R-L) may serve as source signals for the generation of the difference soundwave field.

A synthetic generation of the rotation signal is possible if there is an audio piece with more than one channel, i.e. already having two, e.g. stereo, channels or even more channels. According to the invention, calculating an at least approximate difference obtains at least an approximation with respect to the difference signal, or rotation signal, which may then be used to drive the respective loudspeakers together with the respective channel signal. To this end, a calculation of two mix signals having a phase difference with respect to each other is performed.

In a further embodiment, in which there are more than two channels, e.g. in case of a 5.1 signal, a down mixer for the first channel signal, e.g., i.e. for the left channel, and a further down mixer for the second channel signal (i.e. for the right channel) are connected upstream of the control signal generator. However, if the signal is available as an original microphone signal, such as an ambisonics signal with several components, each down mixer is configured to accordingly calculate, from the ambisonics signal, a left channel or a right channel which is then used by the control signal generator to calculate the control signals.

According to a first aspect of the present invention, the loudspeakers are arranged separately from the control signal generator. In such an embodiment, the loudspeakers have signal inputs that may be wired or wireless, wherein a signal for a sound generator in the loudspeaker is generated at each signal input. The control signal generator providing the control signals for the sound generator is arranged away from the actual loudspeaker and is connected to the loudspeakers via a communication link such as a wired connection or a wireless connection.

In another embodiment, the control signal generator is integrated into the loudspeakers or into a loudspeaker or into the vehicle. In such a case, in the loudspeaker with an integrated signal processor, the common mode signal is derived, and, depending on the implementation and the embodiment, the push-pull signal is derived separately, or is derived from the common mode signal. An aspect of the present invention therefore concerns the loudspeaker without a signal processor. Another aspect of the present invention therefore concerns the signal processor without a loudspeaker, and a further aspect of the present invention concerns the loudspeaker with an integrated signal processor.

In a further embodiment of the present invention, when a multi-signal is available, e.g. as a stereo signal or as a signal with three or more channels, the control signals are derived from this multi-channel representation. In case of a stereo signal, e.g., a side signal representing the difference of the left and the right channel is calculated, this side signal then possibly being attenuated or amplified accordingly, and, depending on the implementation, being mixed with a non-high pass filtered or a high pass filtered common mode signal. If the output signal has several channels, the mix signals may be generated from differences between any two channels of the multi-channel representation. Thus, e.g., a difference between the left and the right rear (right surround) may be generated, or alternatively, a difference between the center channel and any one of the other four channels of a five-channel representation. In case of such a five-channel representation, however, as is the case in a stereo representation, a difference between left and right may be determined to generate the side signal. In a further embodiment, certain channels of the five-channel representation may be added, i.e., a two-channel down mix may be determined. An exemplary implementation for generating a two-channel down mix signal consists of adding, possibly with weighting factors, left rear (left surround), left, and center, to generate a left down mix channel. To generate the right down mix channel, the right rear channel (right surround) is added with the right channel and the center channel, possibly again with weighting factors. The mix signal may then be determined on the basis of a difference formation from the left down mix channel and the right down mix channel.

BRIEF DESCRIPTION OF THE DRAWINGS

Embodiments of the present invention will be detailed subsequently referring to the appended drawings, in which:

FIG. 10 shows an advantageous embodiment of the present invention in a schematic illustration with a distance measurement between the head and the loudspeakers.

DETAILED DESCRIPTION OF THE INVENTION

FIGS. 1 to 10 show aspects for generating sound in a vehicle according to the invention. According to the invention, the sound generators are mounted in a vehicle, such as a land vehicle (car, train, sled, motor vehicle, . . . ), an air vehicle ("passenger" aircraft, helicopters, zeppelin, etc.), a water vehicle (boat, ferry, yacht, sailboat, etc.), or a spacecraft, and advantageously in a headrest for a driver of the vehicle or for a passenger of the vehicle or for a co-pilot of the vehicle.

The headrest, or the sound generators, comprises at least one left and one right loudspeaker arranged left and right, respectively, of a respective ear of the driver or the passenger.

Preferably, the other sound system in the vehicle continues to run in addition and, e.g., performs a localization of sound sources in the space, possibly by means of amplitude panning, etc. The additional acoustic irradiation through the loudspeakers takes place in parallel to the conventional acoustic irradiation.

Preferably, loudspeakers are provided at several seats in the vehicle, wherein loudspeakers for an unoccupied seat are deactivated, e.g. which may be achieved by means of a sensor or alternative means.

The loudspeakers generate difference soundwave fields. These may be generated via an oscillating surface (planar transducer) or via two neighboring piston transducers oscillating in push-pull mode (loudspeakers), or via other described transducers. Mono signals and/or difference signals (L-R and/or R-L) may serve as source signals for the generation of the difference soundwave field.

Figure 1:
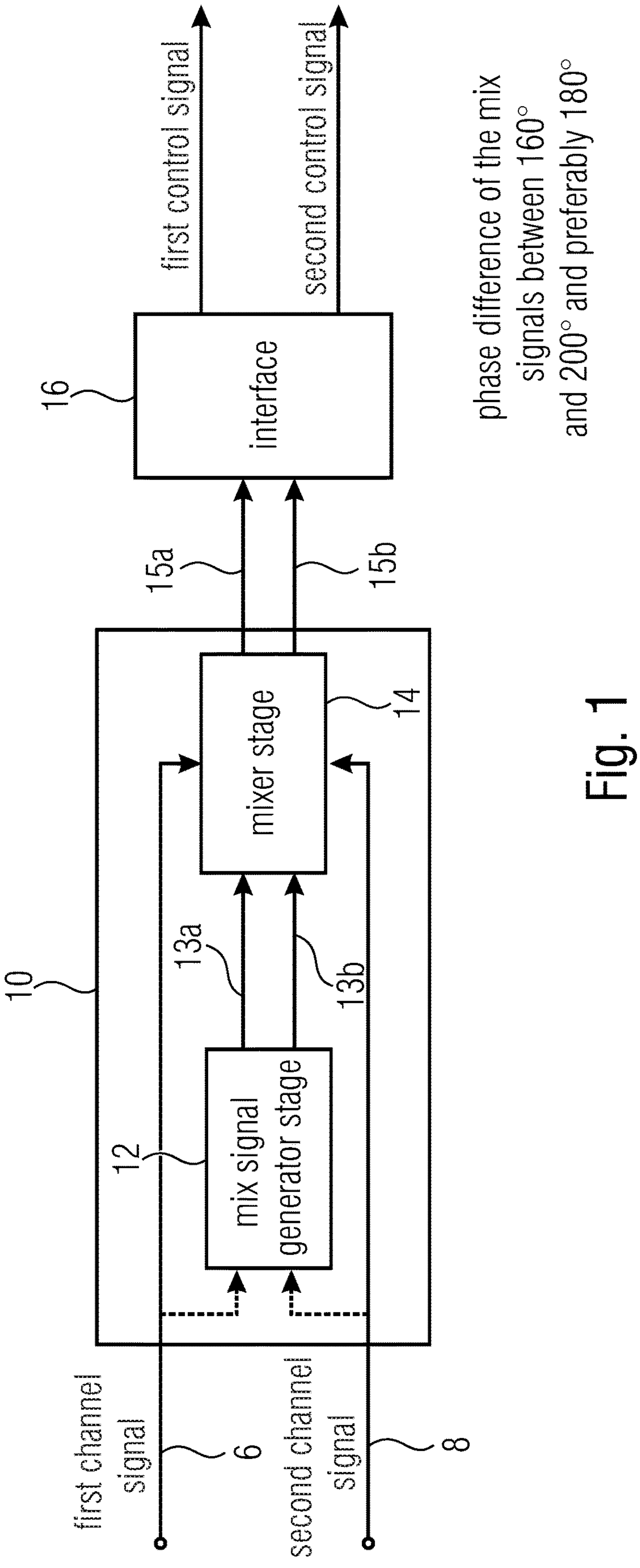
FIG. 1 shows an advantageous embodiment for an apparatus for supplying sound in a space.
Figure 2:
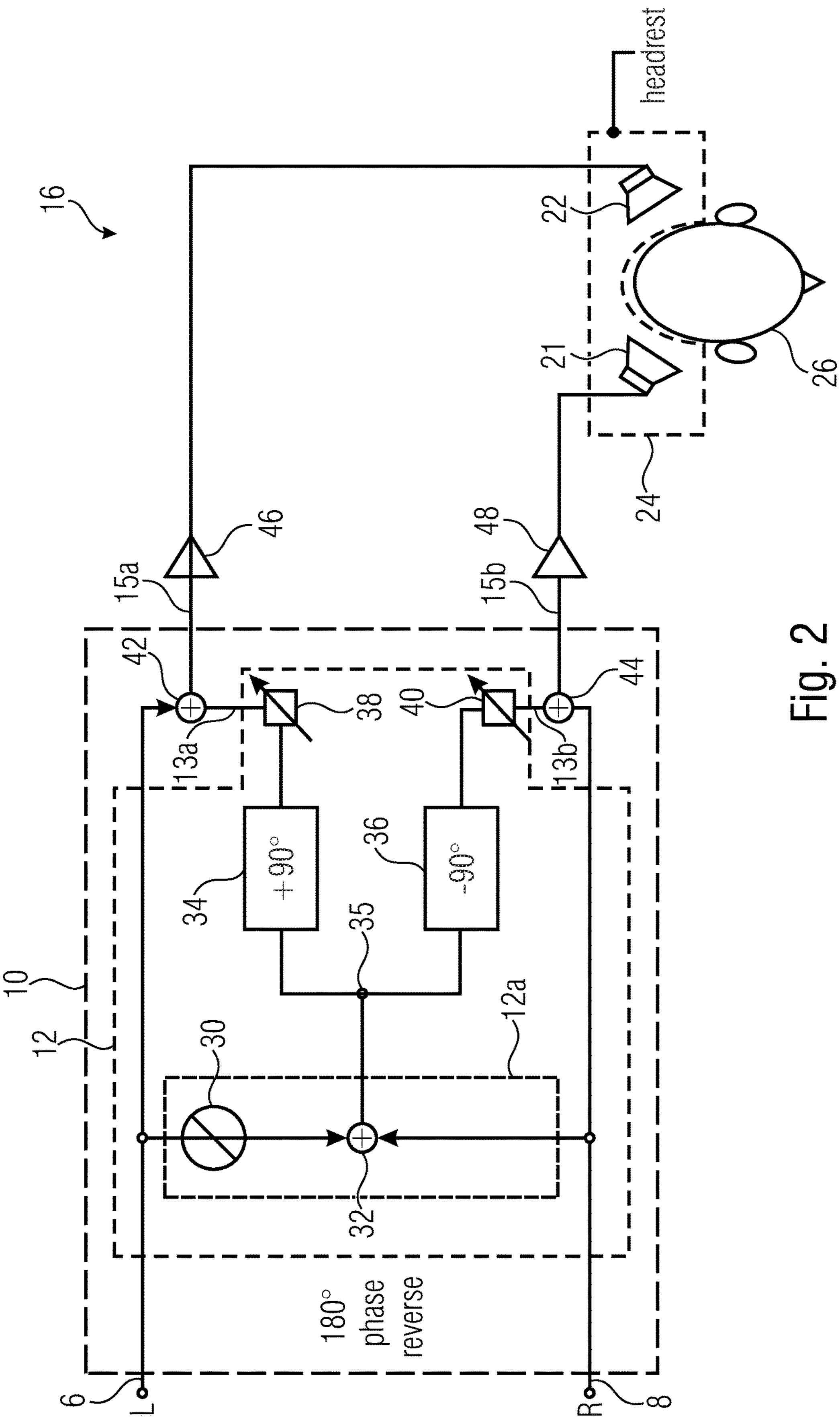
FIG. 2 shows a first embodiment with a difference signal as a basis for the mix signal.

FIG. 1 shows an apparatus for supplying sound in space with a first loudspeaker 21 and a second loudspeaker 22 illustrated in FIG. 2 and other Figures. The apparatus includes a control signal generator 10 for generating a first control signal 15*a* for the first loudspeaker 21 and a second control signal 15*b* for the second loudspeaker 22, wherein the control signal generator 10 comprises a mix signal generator stage 12 and a mixer stage 14 downstream thereof. The mix signal generator stage 12 generates a first mix signal 13*a* for the first control signal and a second mix signal 13*b* for the second control signal. The mix signal generator stage 12 receives at an input either the first channel signal 6 or the second channel signal 8 or both channel signals as input signals, depending on the implementation.

The mix signal generator stage 12 is configured to generate the mix signals such that the first mix signal 13*a* and the second mix signal 13*b* comprise a phase difference with respect to each other. This phase difference of the mixed signals is advantageously between 1600 and 200°, and most advantageously at 180°, so as to obtain, by means of the sound field generated through the two loudspeakers in the space to be supplied, a listening impression that is as psycho-acoustically and qualitatively positive as possible. The mixer stage 14 is configured to mix the first channel signal 6 with the second mix signal 13*a* to obtain the first control signal 15*a*. In addition, the mixer stage 14 is configured to mix the second channel signal 8 and the second mix signal 13*b* to obtain the second control signal 15*b*. The control signal generator means 10 has connected downstream thereof an interface 16 to transmit the first control signal 15*a* and the second control signal 15*b* to the first loudspeaker 21 and the second loudspeaker 22, respectively.

Depending on the embodiment, the interface may be a wired interface so that the first loudspeaker 21 and the second loudspeaker 22 are arranged at an output of the interface 16, possibly via amplifiers 46, 48 illustrated in FIG. 2. Alternatively, the interface may be a wireless interface, exemplarily illustrated in FIG. 7. Here, the interface 16 includes a transmitter stage (TX) 16*a* and an antenna 16*b* downstream thereof. On the receiver side, or loudspeaker side, there is a receiver stage (RX) 16*b* together with a reception antenna 16*a*. The two control signals are then supplied to a first reception amplifier 62 and a second reception amplifier 64, respectively, so as to supply the amplified control signal to the loudspeakers 21, 22.

Preferably, the space is an interior space of a vehicle, and the apparatus further comprises the first loudspeaker and the second loudspeaker 21, 22, wherein these two loudspeakers are arranged in the vehicle. Alternatively, the space may be the interior room of a waiting area of a civil service office, an airport, a ferry terminal, or any other "station", or also the waiting area of a doctor's office, having arranged therein seats provided with headrests or the like to achieve a sound supply for a user of the seats.

In particular, as shown in FIG. 2, the loudspeakers are arranged in a headrest 24 of the vehicle, or in a seat in the vehicle and/or in the stationary space (or room). In the example of the vehicle, the seat may be the driver seat. Alternatively, however, the seat may be the passenger seat or any other seat for a passenger in the vehicle, being provided with a headrest 24, which is normally the case for all seats. If there is no headrest, which may be the case in a seat in a stationary space, the two loudspeakers are arranged near the head of the user by means of another corresponding apparatus, or the loudspeakers are configured to generate a sound field around the head of the user, this sound field comprising the direct sound portion due to the channel signals and also comprising the push-pull mode portion, or rotatory portion, or a difference wave field, due to mixing the mix signals with the channel signals.

By means of the loudspeaker arranged in the vicinity of the two ears of the user, a wave field comprising the common mode portion and comprising a push-pull mode portion, or differential mode portion, due to the mix signals is generated around the user.

Through this, a particularly natural and high quality sound impression is generated for the space to be supplied with the sound, not only having a pleasant and natural sound quality, but also a high speech comprehensibility in case the main aspect is the transmission of messages.

In advantageous embodiments of the present invention, the mix signal generator stage 12 includes an input stage 12*a* and a branching stage 12*b*, wherein the input stage is configured to generate a common signal, as can be seen in FIG. 2 at the output of the input stage 12*a*, wherein the branching stage is configured to generate from this common signal the first mix signal 13*a* and the second mix signal 13*b* that have a phase difference of advantageously 180° with respect to each other. To this end, in the embodiment shown in FIG. 2, the input stage 12*a* includes a phase inverter 30 generating a phase inversion (or phase reverse). In addition, an adder is provided, shown at 32 in FIG. 2. The output signal of the adder 32 represents the common signal. In the embodiment shown in FIG. 2, this output signal is the signal R-L, i.e. a difference signal from the right, or second, channel signal 8 and the left, or first, channel signal 6. However, it is to be noted that the two channel signals do not necessarily have to be a left channel and a right channel, but may also be a left rear channel ("left surround") or a right rear channel ("right surround"). Alternatively, the first channel signal and the right channel signal may also be a left and right downmix, respectively, of any multichannel format with five, seven, or more channels. Alternatively, the left or right channel signal may also be a front/rear down mix signal from a 5.1, 7.1, or any other multichannel signal format.

The branching stage 12*b* downstream of the input stage 12*a* includes a branching point 35 and a first downstream 90° phase shifter 34, or a second downstream −90° phase shifter 36. Both phase shifters 34, 36 are configured to generate at their output a signal pair having the phase difference. In addition, the downstream stage 12*b* in FIG. 2 is configured to amplify the signals at the outputs of the two phase shifters 34, 36, or to adjust the level by means of corresponding level adjusters 38, 40, to obtain the mix signals 13*a*, 13*b* at the output of the level adjusters 38, 40.

In the embodiment shown in FIG. 2, the mixer stage 14 includes a first adder 42 for the first channel signal 6 and a second adder 44 for the second channel signal 8. However, the mixer stage may also be configured to not perform a pure addition, but a weighted addition, or any other operation to combine, i.e. to mix, in the time range, in the frequency range, or in any other way, the first channel signal with the first mix signal and the second channel signal with the second mix signal, respectively.

At the output of the branching stage, which is also the output of the control signal generator 12, there are the two control signals 15*a*, 15*b* that are amplified within the interface 16, comprising the two amplifiers 46, 48 in the embodiment shown in FIG. 2, so as to be supplied to the first loudspeaker 21 and the second loudspeaker 22, respectively, arranged in the headrest of a vehicle, or in a seat in a stationary space, in the embodiment shown in FIG. 2. Through this, by means of the relatively close irradiation of the push-pull mode wave field, or difference wave field, represented by the two mix signals 13*a*, 13*b*, a high quality hearing impression is achieved for the hearer schematically illustrated at 26, additionally comprising a superior speech comprehensibility due to the greater naturalness of the generated sound field.

Figure 3:
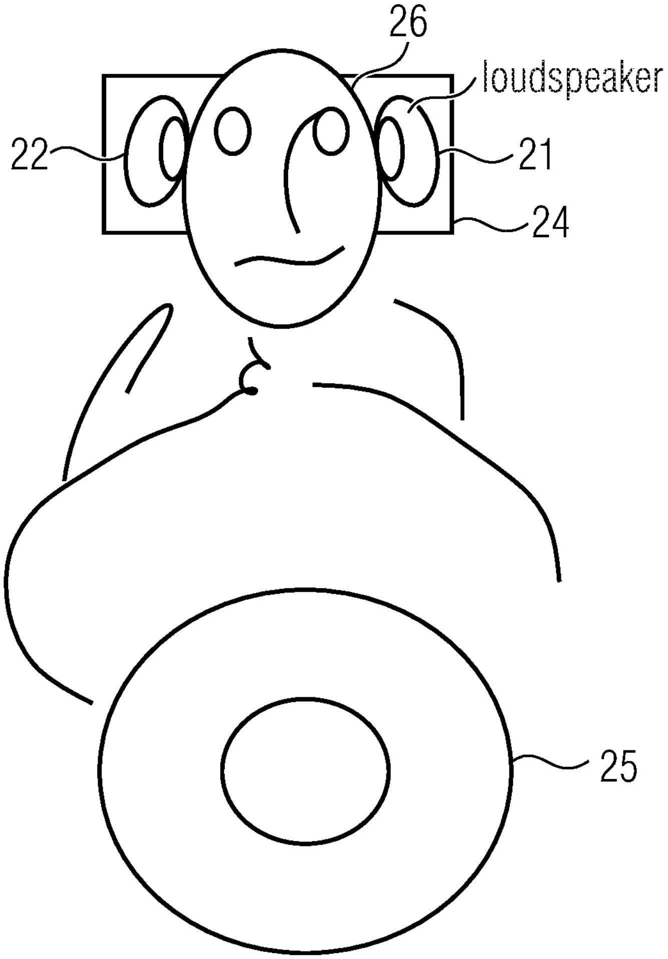
FIG. 3 shows an arrangement of the two loudspeakers by using an example of a vehicle interior space with a driver.

FIG. 3 shows a front view of the listener 26 sitting in the driver seat of a vehicle controlled by a steering wheel 25. It is illustrated that the loudspeakers are arranged behind the ears, or next to the two ears of the listener, and that the emission direction of the loudspeakers is directed towards the viewing direction of the listener if the listener adopts a normal position in the seat.

Figure 4:
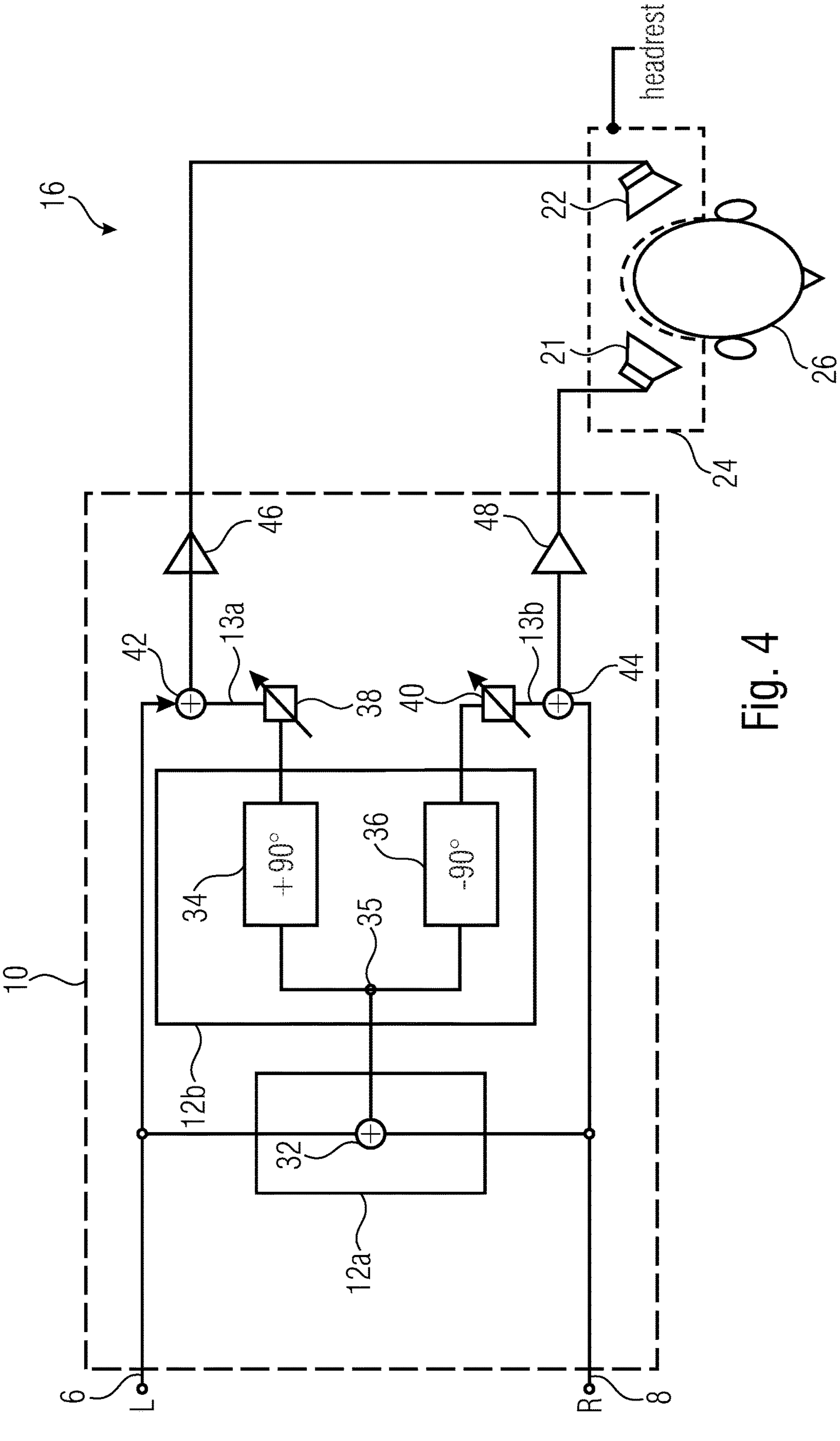
FIG. 4 shows an embodiment with a sum signal as a basis for mix signals.

FIG. 4 shows an alternative embodiment for generating the two mix signals 13*a*, 13*b*. In the embodiment shown in FIG. 4, the branching stage 12*a* does not include a phase inversion, in contrast to FIG. 2. This means that the common signal at the branching point 35 of the branching stage is a mono signal, i.e. the sum of the left and the right signal. This common signal is again supplied to the two phase shifters 34, 36 to generate the mix signal present at the output of the branching stage 12*b*. In the embodiment shown in FIG. 4, the level adjusters 38 and 40 are in functional unity with the mixer, i.e. they are part of the mixer, and the addition between the channel signal and the corresponding mix signal takes place according to a weighting of the mix signal. Alternatively, the channel signal may also be weighted, even though this is not illustrated in FIG. 4. In addition, the channel signal on the one hand and the mix signal on the other hand may both be weighted, wherein this weighting may take place stationary, i.e. fixed, or dynamically, i.e. within an audio piece, in a variable manner.

Figure 5:
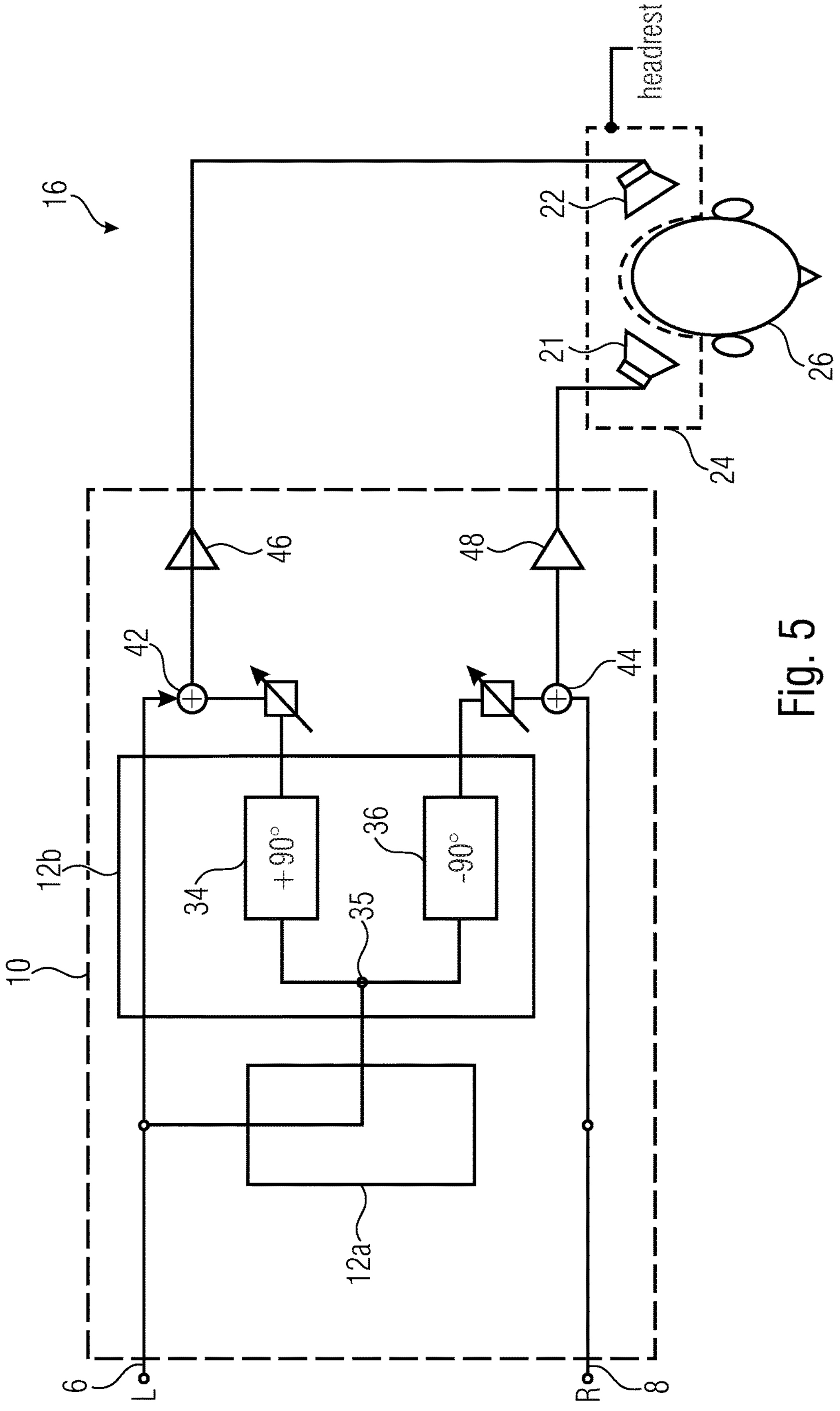
FIG. 5 shows an implementation of the invention with a channel signal as the basis for the mix signal.

In the embodiment shown in FIG. 5, the branching stage 12*b* is configured same as in FIG. 4. However, the input stage 12*a* is configured such that the input signal into the mix signal generator stage is only the first channel signal 6.

Figure 6:
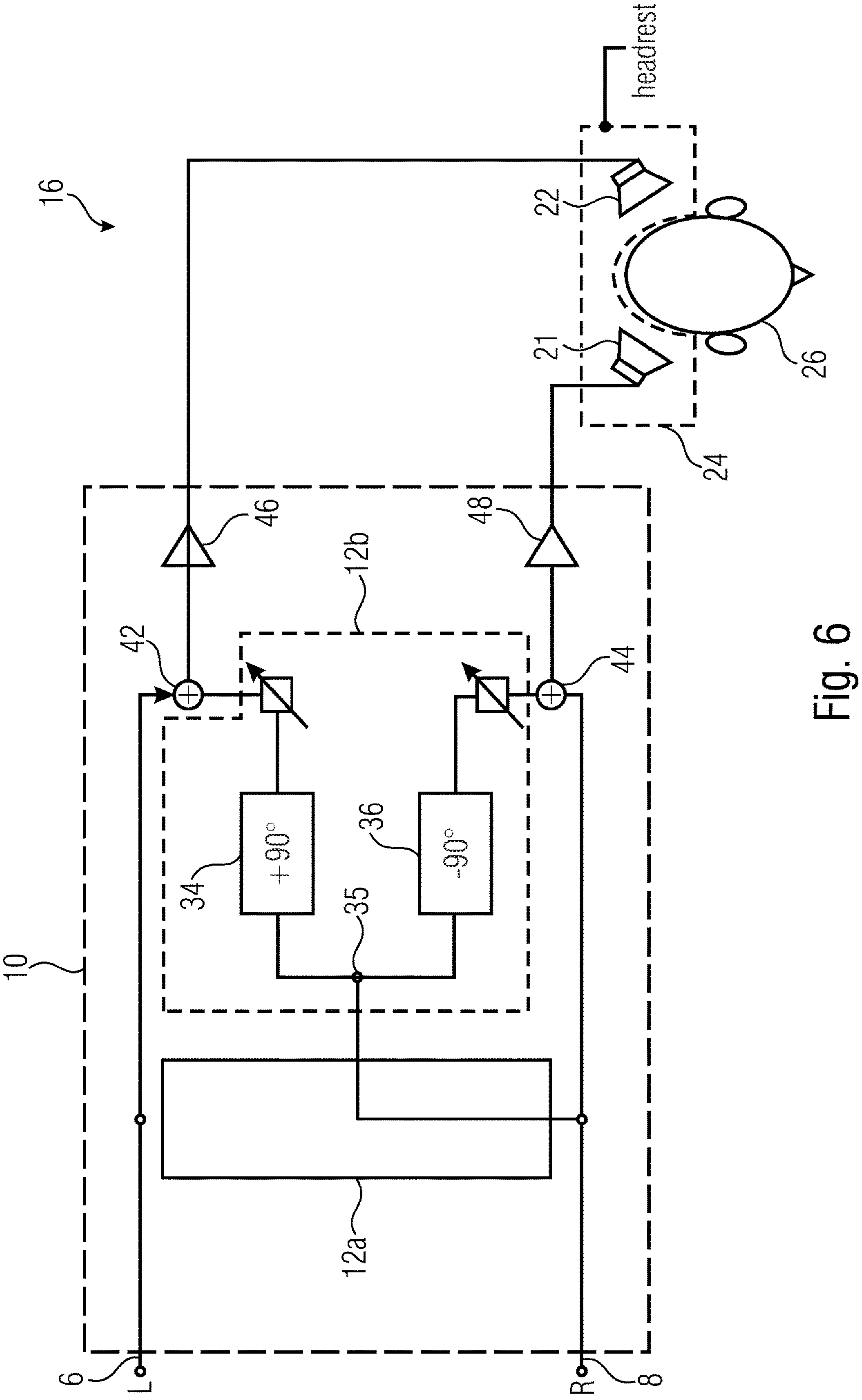
FIG. 6 shows a further embodiment with another channel signal and the basis for the mix signals.

In the embodiment shown in FIG. 6, the input stage 12*a* is configured such that only the second channel signal 8, i.e. the right channel signal in the embodiments shown in FIG. 6, is the input signal.

Figure 7:
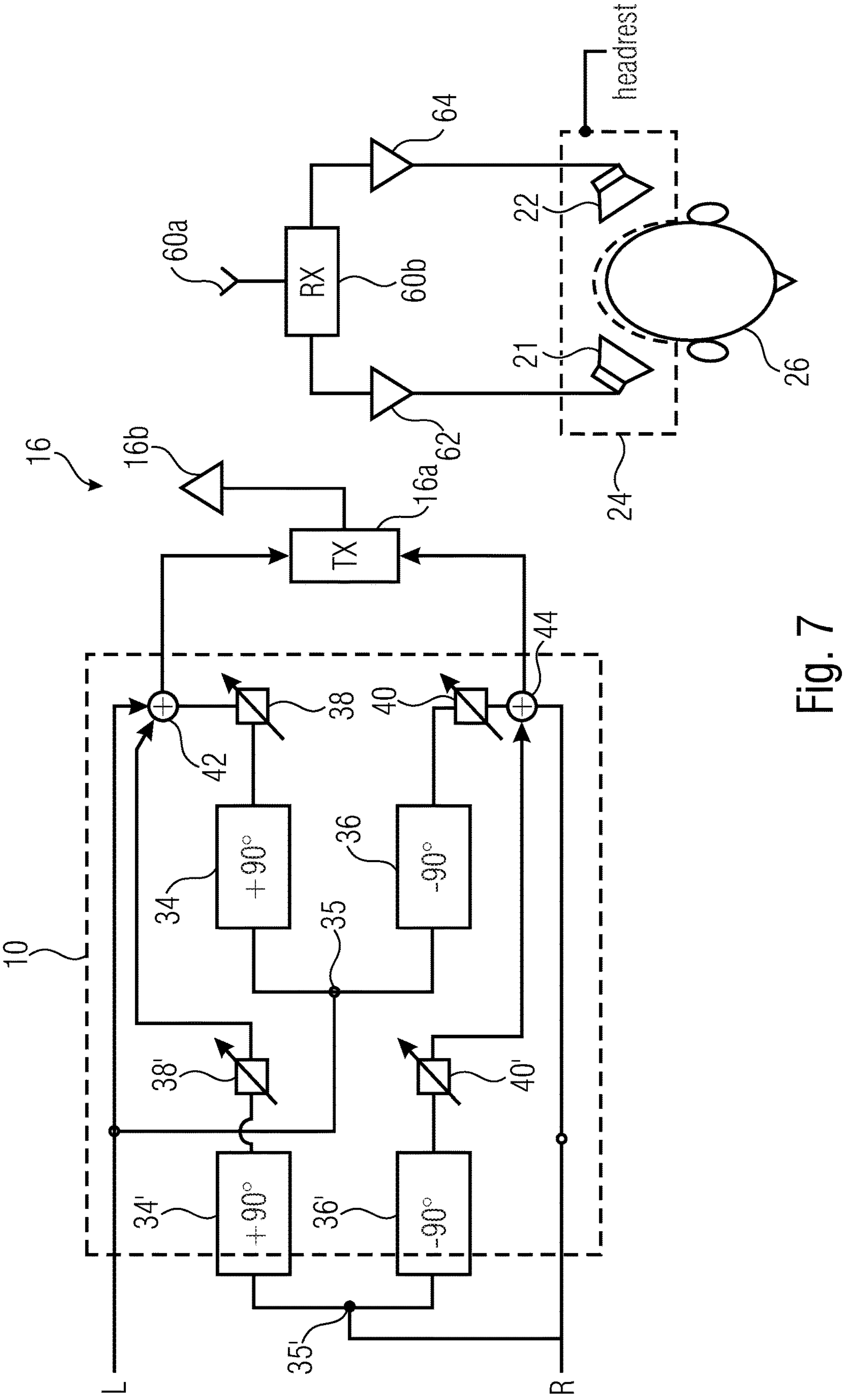
FIG. 7 shows an embodiment using two channel signals as the basis for the mix signals, wherein the mix signal generator stage comprises a further input stage and a further branching stage.

In the embodiment shown in FIG. 7, the implementation of the input stage is the same as in FIG. 5. In addition, a further input stage is provided, configured as in FIG. 6, and a further branching stage is provided, comprising the branching point 35', the first phase shifter 34' and the second phase shifter 36'. The further branching stage may also include level adjusters 38', 40'. In addition, in the embodiment shown in FIG. 7, the mixer stage 14 is configured to mix the channel signal not only with a first mix signal of the first branching stage, but also with a further first mix signal of the further branching stage, i.e. the branching stage comprising the branching point 35' as an input node. The further branching stage and the branching stage may be structured identically, as is the case in the embodiment shown in FIG. 7. However, they may also be a configured differently, i.e. with other phase shifter values, or other level adjustment values, depending on the implementation.

Furthermore, it is to be noted that the interface design, which includes a wireless implementation in the embodiment shown in FIG. 7, may also be implemented in the same way in the embodiments according to FIGS. 2, 4, 5, 6. In addition, the interface in FIG. 7 may also be configured identically as in FIG. 2, for example, i.e. with a wired supply of the loudspeakers 21, 22.

Figure 8:
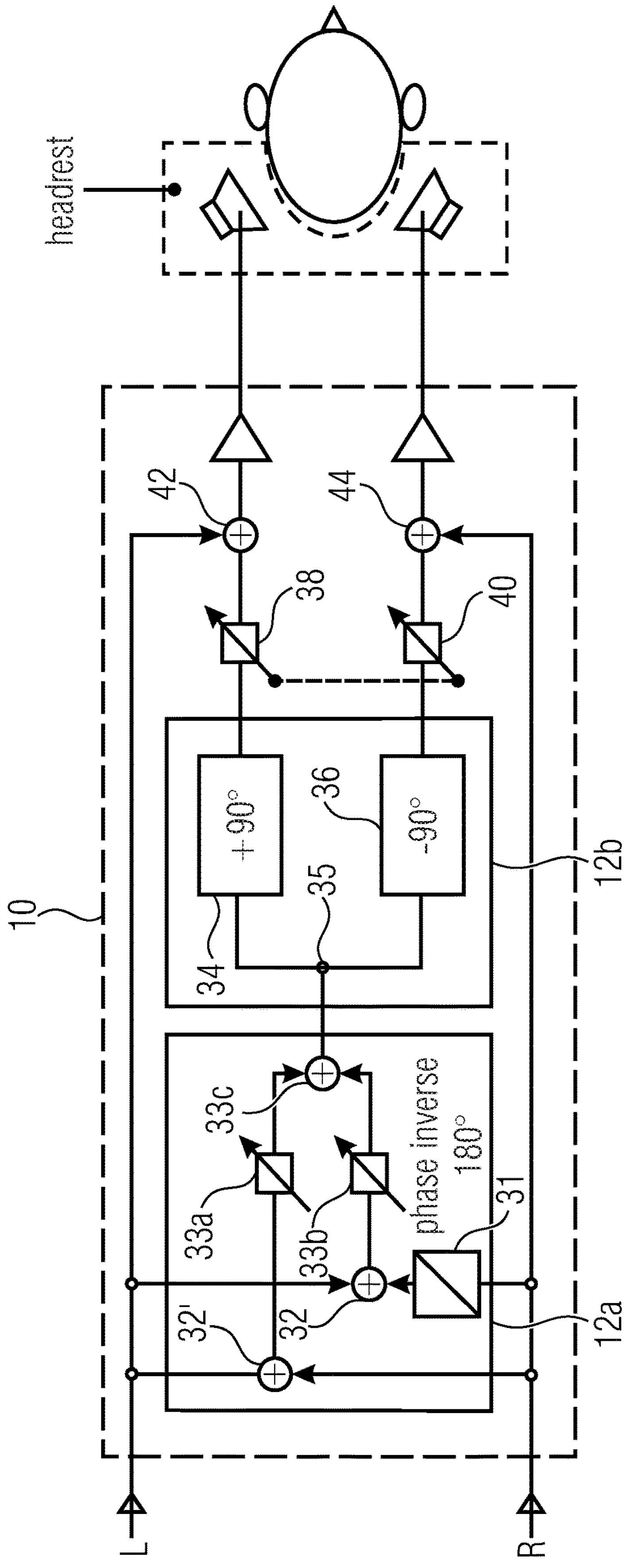
FIG. 8 shows a further embodiment with a mono signal and a difference signal as the basis for the two mix signals.
Figure 9:
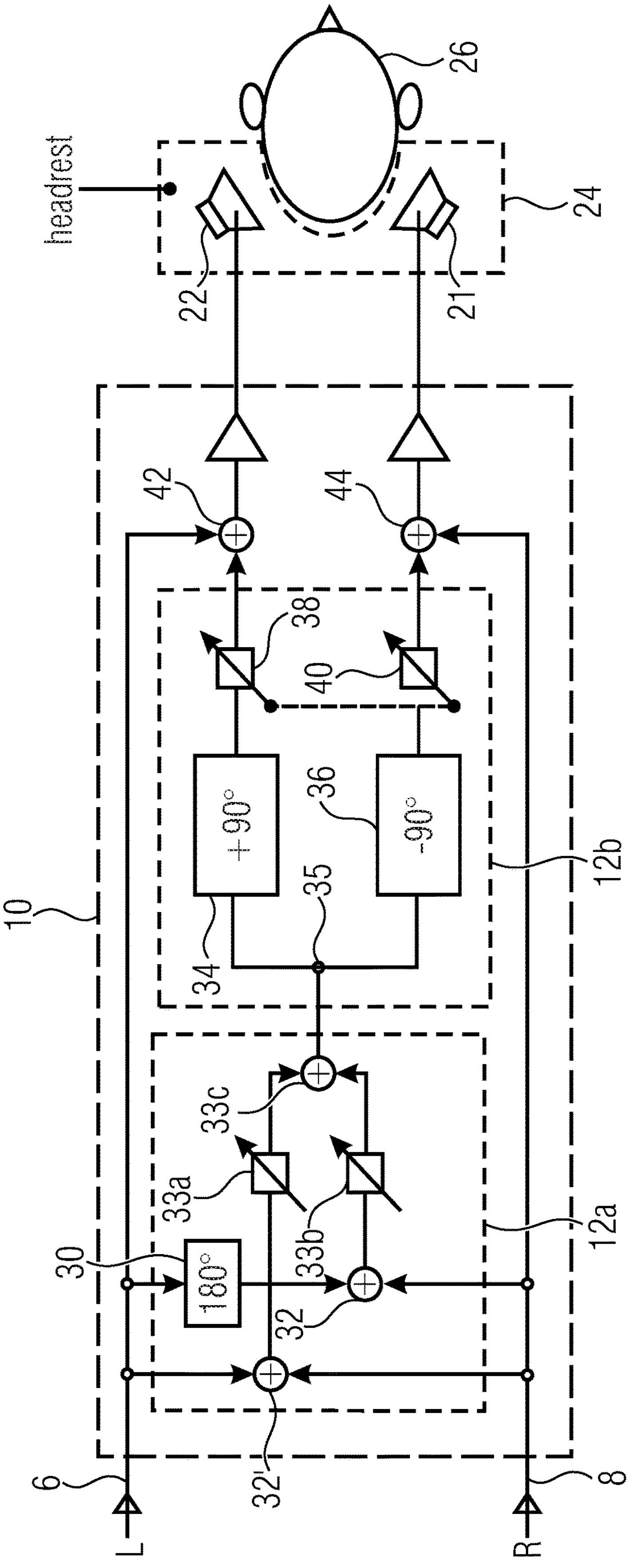
FIG. 9 shows an alternative embodiment with reference to FIG. 8, wherein the other channel signal is phase-inverted.

FIG. 8 shows a further embodiment, wherein the input stage uses the difference signal at the output of the adder 32 and the sum signal at the output of an adder 32'. Depending on the implementation, these two signals may also be adjusted with respect to their level, as is illustrated by means of the two level adjusters 33*a*, 33*b*, and, in this embodiment of FIG. 8, these two signals at the output of the level adjusters 33*a*, 33*b* are added by means of an adder 33*c* to obtain the common signal that is then processed by the branching stage 12*b*, as is exemplarily shown on the basis of other figures, i.e. with the first phase shifter 34, the second phase shifter 36, and the level adjusters 38, 40 that are together driven with the same adjustment value in the embodiment shown in FIG. 8. However, they may also be driven with different control values, as is the case in the previous figures, or the respective level adjuster 38 and the other level adjuster 40 may be driven with the same adjustment value in the previous figures as well.

In the embodiment shown in FIG. 8, the common signal from which the two mix signals are derived is determined from the mono signal, i.e. the sum from left and right, and a first difference signal, i.e. the signal (L-R). In an alternative embodiment illustrated in FIG. 9, however, in contrast to FIG. 8, the common signal is determined at the output of the combiner 33*c* again from the mono signal but also from the other difference signal, i.e. (R-L), as was the case in FIG. 2, wherein the phase inverter 30 is arranged between the first channel signal 6 and the adder 32 in both implementations.

Even though the branching stage illustrated in FIGS. 2, 4-9 comprises a +90° phase shifter 34 and a −90° phase shifter 36, it is to be noted that this is only an advantageous embodiment which generates particularly high quality results. Alternatively, the branching stage may also be configured such that a phase shifter generates only 70°, for example, and the other phase shifter also generates only −70°, or −110°, to again obtain an advantageous phase difference value of 180° on the output side. Alternatively, a branch of the branching stage 12*b* may operate without phase shift, whereas the other branch operates with a phase shift of 180°, which is particularly easy to realize if a male/female combination is set in a "reverse order" so to speak. Such an implementation of the phase difference of 180° in the phase shifter 30 of FIG. 9, or FIG. 2, or in the phase shifter 31 of FIG. 8, is also advantageous in embodiments, in which there is no implementation integrated on a circuit board.

In addition, it is to be noted in advantageous embodiments that the difference signal is a direct difference between left and right, i.e. a difference that is achieved if one of the two signals is inverted and the addition between the one signal and the inverted other signal is then calculated. Alternatively, other differences may be calculated, e.g., achieved by mathematically calculating a difference without having available an explicit phase shifter. In addition, the corresponding "difference signals" may be calculated in the time range or in the frequency range or in an LPC range. In other embodiments, there is a phase shifter that does not generate a phase shift of 180°, but only with a value of between 90° and 180°. There is still a difference, however, it does not correspond to the actual "mathematical" difference. Such a difference signal is also useful in an embodiment of the present invention so as to generate a difference wave field at the output of the two loudspeakers if mix signals are derived from such a "difference signal".

FIG. 10 shows a further embodiment of the present invention in which a distance measurement is performed so as to determine a distance between the corresponding loudspeakers 21 and/or 22 and the head or the head side or the ear of the listener. These distance sensors are shown at 51, 52 and are advantageously arranged in the headrest 24 next to the loudspeakers 21, 22, within the two loudspeakers, as is illustrated in the right image of FIG. 10. The distance measurement by means of the distance sensors 51, 52 is used to perform a signal manipulation of the two control signals 15*a*, 15*b*. This adjustment is carried out to achieve a volume compensation and/or a bass compensation and/or a delay compensation for the two loudspeaker signals, i.e. the two control signals 15*a*, 15*b*.

In particular, if the distance between the head and the loudspeaker increases, the level of the loudspeaker signals is increased by a sound processor not shown in FIG. 10. For example, this may be achieved within the amplifiers 46, 48 if they are configured to be controllable. Alternatively or additionally, the basses for the corresponding loudspeakers may be increased, which in turn may be achieved by the adjustable loudspeaker 46, 48 if they are configured as frequency-selective amplifiers, or if a corresponding equalizer is provided. In optional embodiments, a delay for a loudspeaker may be adjusted compared to another loudspeaker, which may be achieved by a phase shifter in front of or behind the corresponding amplifiers 46, 48 in the corresponding signal path, i.e. for the corresponding control signals 15*a*, 15*b*.

However, if the distance between the head and the loudspeaker decreases, and is measured by one of the ultrasound sensors 51, 52, a sound processor is configured to reduce the level of the corresponding loudspeaker signal and/or the basses for the loudspeakers. Optionally, the delay for this loudspeaker, compared to the other loudspeaker, may be increased if a distance reduction is detected between the head and the loudspeaker.

In addition, in advantageous embodiments, in which the rooms/spaces to be supplied have several seating positions, such as several seats in a vehicle or several seats in a waiting area in a stationary space, a detector is arranged at each seat so as to detect if the seat is actually occupied by a listener. If it detects that the seat is occupied, the loudspeakers are driven as is illustrated in FIGS. 1-9. However, if it determines that a seat or several seats are not occupied, the loudspeakers are deactivated for this seat, or for the several seats, or their output level is greatly reduced so as to avoid superfluous sound generation. It is to be noted that the deactivation may be a complete deactivation, i.e. a switch off, or a partial deactivation, i.e. a reduction of the output level by a significant amount, such as by at least 10 decibels.

A advantageous embodiment of the present invention is located within a mobile device, such as a mobile phone, a tablet, a notebook, etc. In particular, the control apparatus, or the apparatus for generating a control signal, is loaded onto the mobile phone as a hardware element or as an app, or program. The mobile phone is configured to receive the first audio signal and the second audio signal or the multichannel signal from any source that may be local or in the internet, and to generate the control signals as a function thereof. These signals are transmitted from the mobile phone to the sound generator with the sound generator elements either in a wired manner or in a wireless manner, e.g. via Bluetooth or WiFi. In the latter case, the sound generator elements have to have a battery supply, or a power supply in general, to achieve corresponding amplifications for the received wireless signals, e.g. according to the Bluetooth format or the WiFi format.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed. Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for supplying sound in a space with a first loudspeaker and a second loudspeaker, comprising:

a control signal generator for generating a first control signal for the first loudspeaker and a second control signal for the second loudspeaker, wherein the control signal generator comprises:

a mix signal generator stage for generating a first mix signal for the first control signal and a second mix signal for the second control signal from a first channel signal or a second channel signal such that the first mix signal and the second mix signal comprise a phase difference, wherein the mix signal generator stage comprises: an input stage to generate a common signal; and a branching stage to generate the first mix signal and the second mix signal from the common signal, wherein the branching stage comprises a first level adjuster for the first mix signal and a second level adjuster for the second mix signal, wherein the first level adjuster and the second level adjuster are controllable together;

a mixer stage for mixing the first channel signal with the first mix signal to acquire the first control signal, and for mixing the second channel signal with the second mix signal to acquire the second control signal; and an interface for transmitting the first control signal to the first loudspeaker and for transmitting the second control signal to the second loudspeaker.

2. The apparatus according to claim 1, wherein the space is an interior space of a vehicle or a stationary space, and wherein the apparatus comprises the first loudspeaker and the second loudspeaker, wherein the first loudspeaker and the second loudspeaker are arranged in the vehicle or in the stationary space.

3. The apparatus according to claim 2, wherein the first loudspeaker and the second loudspeaker are arranged in a headrest of the vehicle or of the stationary space.

4. The apparatus according to claim 1, wherein the control signal generator is configured to control the first loudspeaker and the second loudspeaker such that a difference wave field is generated by controlling the first loudspeaker with the first control signal and by controlling the second loudspeaker with the second control signal.

5. The apparatus according to claim 1, wherein the mix signal generator stage is configured to generate the first mix signal and the second mix signal so that the phase difference is between 16° and 200°.

6. The apparatus according to claim 1, wherein the mix signal generator stage is configured to adjust levels of the first mix signal and the second mix signal.

7. The apparatus according to claim 1, wherein the mix signal generator stage is configured to generate the first mix signal and the second mix signal from a difference between the first channel signal and the second channel signal, from a sum of the first channel signal and the second channel signal, only from the first channel signal, only from the second channel signal, from a combination of the sum and the difference of the first channel signal and the second channel signal, or from a combination of the first channel signal and the second channel signal.

8. The apparatus according to claim 1, wherein the mix signal generator stage comprises a phase transducer to generate a difference signal from the first channel signal and the second channel signal and to process in a first manner the difference signal or a signal derived from the difference signal so as to generate the first mix signal and to process in a second manner the difference signal or a signal derived from the difference signal so as to generate the second mix signal, wherein the second manner differs from the first manner.

9. The apparatus according to claim 1, wherein the branching stage comprises a first phase shifter for the first mix signal and a second phase shifter for the second mix signal, wherein the first phase shifter and the second phase shifter are configured such that the first mix signal and the second mix signal comprise the phase difference.

10. The apparatus according to claim 1, wherein the input stage is configured to determine a difference signal from the first channel signal and the second channel signal, wherein the difference signal represents the common signal, or wherein the input stage is configured to determine a sum signal from the first channel signal and the second channel signal, wherein the sum signal represents the common signal, or wherein the input stage is configured to determine a difference signal from the first channel signal and the second channel signal, to determine a sum signal from the first channel signal and the second channel signal, and to combine the difference signal or a signal derived from the difference signal and the sum signal or a signal derived from the sum signal so as to acquire the common signal.

11. The apparatus according to claim 1, wherein the interface or the mixer stage is configured to amplify the first control signal and to apply the amplified first control signal to the first loudspeaker, and wherein the interface is configured to amplify the second control signal and to apply the amplified second control signal to the second loudspeaker, or wherein the interface comprises a radio interface to emit the first control signal and the second control signal in a wireless manner.

12. The apparatus according to claim 2, wherein the first loudspeaker is arranged on the left with respect to a driver position, and the second loudspeaker is arranged on the right with respect to a driver position, or wherein the first loudspeaker is arranged in the stationary space on the left with respect to a seating position, and the second loudspeaker is arranged in the stationary space on the right with respect to the seating position, wherein a pair of loudspeakers is arranged at several positions in the vehicle or in the stationary space, wherein a detector is configured to detect whether a position of the several positions is occupied, and wherein the apparatus is configured to deactivate for an unoccupied position the pair of loudspeakers associated to the unoccupied position.

13. The apparatus according to claim 2, comprising a sound system with a multitude of further loudspeakers arranged in the vehicle or in the stationary space, and a sound processor configured to process a multichannel audio signal such that a localization of sound sources in the vehicle or in stationary space is achievable.

14. The apparatus according to claim 2, comprising:

a first distance sensor next to the first loudspeaker and a second distance sensor next to the second loudspeaker or a common distance sensor for measuring a distance between a head and the respective loudspeaker, and wherein the control signal generator is configured to, as a response to a sensor signal from the first, the second, or the mutual sensor in case of a varied distance, change the level of the control signal for the first and the second loudspeaker, respectively, or with respect to trebles and basses, or with respect to a delay between the control signals.

15. The apparatus according to claim 14, wherein the first distance sensor and the second distance sensor or the common distance sensor are accommodated in a headrest of the vehicle or in a seat in the stationary space.

16. The apparatus according to claim 14, wherein the control signal generator is configured to, in case of the first, second, or common distance sensor detecting an increasing distance between the head and the first and/or second loudspeaker, increase a level or low frequencies compared to higher frequencies of the control signal for the loudspeaker, or to reduce a delay of the control signal for the loudspeaker, or wherein the control signal generator is configured to, in case of the first, second, or common distance sensor detecting a decreasing distance between the head and the first and/or second loudspeaker, reduce a level or low frequencies compared to higher frequencies of the control signal for the loudspeaker, or to increase a delay of the control signals for the loudspeaker.

17. A space, comprising:

a first loudspeaker and a second loudspeaker; and an apparatus for supplying sound in the space according to claim 1.

18. A space according to claim 17, configured to be an interior space of a vehicle, or wherein the first loudspeaker and the second loudspeaker are arranged spaced apart between 10 cm and 1 m, or comprising a seat for a person with a headrest at which or in which the first loudspeaker and the second loudspeaker are arranged.

19. A method for supplying sound in a space with a first loudspeaker and a second loudspeaker, comprising:

generating a first control signal for the first loudspeaker and a second control signal for the second loudspeaker, wherein generating comprises:

generating a first mix signal for the first control signal and a second mix signal for the second control signal from a first channel signal or a second channel signal such that the first mix signal and the second mix signal comprise a phase difference, wherein the generating comprises: generating a common signal; and generating the first mix signal and the second mix signal from the common signal using a first level adjuster for the first mix signal and a second level adjuster for the second mix signal, wherein the first level adjuster and the second level adjuster are controllable together;

mixing the first channel signal with the first mix signal to acquire the first control signal, and for mixing the second channel signal with the second mix signal to acquire the second control signal; and transmitting the first control signal to the first loudspeaker and for transmitting the second control signal to the second loudspeaker.

* * * * *